United States Patent

Ruffo

[15] 3,675,403
[45] July 11, 1972

[54] FLAME RETARDANT AIR FILTER CONSTRUCTION WITH THERMOPLASTIC SCRIM

[72] Inventor: Angelo P. Ruffo, Montreal, Quebec, Canada

[73] Assignee: Johnson & Johnson

[22] Filed: March 10, 1970

[21] Appl. No.: 18,315

[52] U.S. Cl.............................................55/524, 210/499
[51] Int. Cl..........................................................B01d 23/02
[58] Field of Search...................55/524, 527, 528, 354, 486, 55/487, 514, 485; 210/499, 490, 491

[56] References Cited

UNITED STATES PATENTS

| | | | |
|---|---|---|---|
| 2,758,671 | 8/1956 | Silverman et al. | 55/527 |
| 3,017,239 | 1/1962 | Rodman | 55/524 |
| 3,201,926 | 8/1965 | Harrington | 55/524 |
| 3,258,900 | 7/1966 | Harms | 55/485 |
| 3,273,321 | 9/1966 | Bauder et al. | 55/524 |
| 3,400,519 | 9/1968 | Korn et al. | 55/499 |
| 3,543,940 | 12/1970 | Schmidt, Jr. | 210/490 |

FOREIGN PATENTS OR APPLICATIONS

| | | | |
|---|---|---|---|
| 781,194 | 8/1957 | Great Britain | 55/499 |

*Primary Examiner*—Bernard Nozick
*Attorney*—Robert L. Minier

[57] ABSTRACT

The invention provides a scrim material permitting the use of normally combustible tackifiers in filter devices, wherein the scrim is composed of an open-network structure with air pressure drop characteristics not exceeding 0.10 inch/water measured at 500 cfm per square foot of filter medium area.

5 Claims, No Drawings

FLAME RETARDANT AIR FILTER CONSTRUCTION WITH THERMOPLASTIC SCRIM

This invention relates to filters.

More particularly, this invention relates to filter media and their construction, which are suitable for use as air filter devices.

The uses of air filter media are well known and established for many different applications, ranging from a simple rectangular media enclosed in a suitable frame for domestic purposes (e.g. furnace filters) to more complex filter structures employed in industrial uses where "continuous length" filter media are required (e.g. in buildings, industrial complexes, etc.). In the latter case, a typical application involves the use of a length of filter media in the order of 45 to 90 feet varying in width, typically 30 to 60 inches, in a roll form. This "cartridge" type of media is fed from a supply roll through a frame to a take-up roll, passing through an aperture where the media serves to filter air. The filter media may be advanced either manually or automatically by suitable mechanical devices.

Typically, filter devices are constructed to include a backing in the form of an air permeable sheet, termed a "scrim" in the art, in juxtaposition with the filter media, for strengthening purposes (normally filter media are not self-supporting) and as well for use in guiding the media through mechanical mechanisms when the latter are used in a "roll" or "cartridge" form.

It is well known in the art that a principal requirement for filter devices is that they must be totally flame retardant. In use, air filter devices may encounter temperatures varying anywhere from ambient to over 100° F., particularly when an air system is shut down for servicing, whereby e.g. radiant heat from heating coils will increase the temperatures encountered.

Thus, filter media components which can only be used are those which are inherently flame retardant, or those rendered flame retardant by treatment with suitable flame retardant agents. The existing state of technology has provided acceptable flame retardant media in the form of, for example, polyester fibers, etc.

Likewise, the scrim as one of the components of a filtering device, must also be flame retardant. The choice of a particular type of material for the scrim is restrictive depending on the use of the desired filter device, in that the scrim must be flexible for most applications. To this end, several different types of materials having a flame retardant characteristic are known in the art, — e.g. cotton scrim and/or vinyl coated glass fiber scrim.

Conventionally, it has been common to improve the efficiency of air filter media by providing a coating of a dust adhesive or tackifier on the scrim and/or filter media. Again, because of the total flame retardant requirements of the filter device, the tackifier in combination with the underlying fiber and/or scrim structure must also be inherently flame retardant or be treated to render it so. Thus, even though the other components of the filter are flame retardant or non-combustible, a tackifier which in combination with the underlying fiber and/or scrim structure is not flame retardant, when ignited at a point, would cause combustion over the whole surface of the filter and/or scrim. The tackifier must also be one which is non-drying (i.e. non-volatile), remains predominantly tacky (i.e. does not lose its effectiveness over a period of time — termed "high tack" in the art) and besides, must be one which is non-migratory. To date, the most effective tackifiers have been found to be the combustible hydrocarbons which have all of the above characteristics, but according to the existing state of technology, it has not been possible to render the hydrocarbons flame retardant to an acceptable degree. Tests have shown that when a typical hydrocarbon tackifier, e.g. a polybutene, has been modified to include as much as 80 percent by weight of flame retardants, flame propagation over a scrim/fiber structure still occurred. In the light of this, the art has therefore had to employ tackifiers which are inherently flame retardant or non-combustible, the most common one being employed to date is di-octyl phosphate. However, such non-combustible tackifiers have one or more disadvantages — namely that they do not remain permanently tacky and eventually dry out. Much research has gone into the development of different types of non-combustible tackifiers, but still without any high degree of success. Because of the vastly superior properties of the normally combustible hydrocarbon tackifiers, some manufacturers have attempted to use them by employing steel wire as a scrim. However, this in itself introduces other problems since it does not give total support that a scrim of cotton or vinyl coated glass fiber would otherwise do. So, there are many disadvantageous features in the filter media that are available at present.

It would be highly desirable if the more effective normally combustible hydrocarbon tackifiers could be employed to improve the characteristics of such filter media, without increasing the danger of self-sustaining combustion in the air filter media construction.

With the present invention, applicant has developed a novel product and method of permitting the incorporation of the more effective normally combustible hydrocarbon tackifiers by altering the structure of the air filter media to overcome the problems associated with accidental combustion of the tackifiers, and which will prevent combustion.

In accordance with this invention, there is provided a filter medium comprising a web of filter material having at least one major filtering face and a layer of scrim in juxtaposition with at least said one major face, the scrim comprising a self-extinguishing non-flame propagating thermoplastic material having an open-network structure with an air pressure drop characteristic not exceeding 0.10 inch/water when measured at an air flow of 500 cfm per square foot of medium area, the product having been treated with a normally combustible hydrocarbon tackifier.

In greater detail, applicant has found in accordance with this invention that an air filter medium having a scrim with the above characteristics overcomes the problems of the prior art and permits the use of far more effective tackifiers. In accordance with this invention, only those materials which have the combined characteristic of being self-extinguishing and with the aforedefined open-network structure and air drop characteristics, as will be evident from the discussion hereinafter, can be used to provide the novel structure.

The term "self-extinguishing" is used in the specification to mean that flame propagation in the structure does not occur — the extent of flame susceptibility of the scrim is confined substantially to the locus in direct contact with any flame inducing means, and due to the open-network scrim structure any portion of the scrim which is ignited by virtue of a coating of flammable tackifier, melts and falls away from adjacent nonignited scrim, thereby preserving the required total fire retardancy characteristic of the structure.

In the light of the above, materials which may be used as the scrim components thus include components which would be subject to combustion except for the fact that they did not have an open-network structure, thereby permitting the use of materials which heretofore could not be used for this reason. Typical of the scrim materials which may be employed in accordance with the present invention include various types of polyolefins — e.g. polypropylene, copolymers of polypropylene with various types of comonomers, etc. Polypropylene is the particularly preferred material for use as the scrim in view of its ready availability and economical attributes.

The scrim material must have an open-network structure with an air pressure drop characteristic not exceeding 0.10 inch/water when measured at an air flow of 500 cfm per square foot of medium area, and preferably not to exceed about 0.02 to about 0.03 inch. The open network scrim is preferably composed of a sheet of material consisting of a single layer of strands or filaments of scrim material intersecting and interconnected with one another to form an open weave or mesh sheet or mat type structure, desirably having from about 2-by-2 to about 6-by-6, most preferably 2-by-2 to about 4-by-6 strands or filaments per inch. The scrim preferably has substantially regular strands or filaments throughout, outlining apertures preferably of a substantially uniform pattern.

The scrim structure of the present invention may be produced by any suitable method including without limitation punching or die-cutting sheet or film material to form apertures therein outlined by strands or ligaments defined by the remaining material, depositing strands or filaments of material in a pattern, and if required joining the strands at points of intersection by suitable means, e.g. heat or adhesive, etc.; stretching in one or more directions film or sheet material having a predetermined pattern of weakened areas therein to open up the weakened areas to a degree sufficient to provide a scrim structure as outlined hereinbefore; still further by extruding or casting the scrim structure in the form outlined above, etc.

The shape of the apertures outlined by the strands or filaments may vary, depending on how the scrim is manufactured and may be any suitable regular or irregular shape, e.g. rectangular or diamond shapes, circular or oval shapes, etc. Still further, most desirably the scrim has a weight of between about 3 to about 9 pounds per thousand square feet of scrim, otherwise it has been found that the scrim material becomes susceptible to flame propagation when coated with a normally combustible tackifier. Heavier weights will render the scrim flame propagating as well as having too high a pressure drop.

Most desirably, the scrim material is chosen so as to have a tensile strength characteristic of at least between 5 to about 13 pounds, most usually from 8 to 10 pounds, per inch. Also, the material chosen for the scrim structure may be selected to have a desired degree of flexibility — as in the case of filters employed as a "cartridge" type, flexibility is required to permit rolling or winding up of the filter media; in other cases, the scrim material need not be as flexible. As is conventional in the thermoplastic art, flexibility of the materials may be modified by suitable additives incorporated into the material.

Further, if the scrim is to be bonded to the filter media, the material for the scrim should be chosen so as to be either heat or adhesively bondable. Likewise, the scrim material should also be chosen to have a service temperature range within the operating temperature ranges which are likely to be encountered in the locus where the filter is to be employed. Generally speaking, most of the more common applications of filters will involve service operating temperatures in the area of from about 0° F. to about 250° F., usually within 40° F. to 180° F. To this end, a material chosen for the scrim can be modified according to conventional techniques in the thermoplastic art, with the necessary additives, to provide material having the desired service temperature characteristic.

With the present invention, as mentioned, it is now possible to employ the more efficient normally combustible hydrocarbon tackifiers known in the art for this purpose but which previously could not be employed for the reasons described. To this end, typical of such tackifiers are those known in the art under the trade names "INDOPOL" and "PETROFIN", both of which denote a polybutene composition thought to be primarily composed of high molecular weight monoolefins, balance isoparaffins. Such normally combustible hydrocarbon tackifiers may be applied to the filter media having the novel structure of the present invention in amounts ranging from about 400 to about 1,600 grains per square yard, calculated on a base air filter media weight of about 2,200 grains per square yard plus or minus 10 percent. However, as will be readily understood by those skilled in the art, such amounts may vary depending on the particular use and type of filter media, as well as other factors.

The filter media per se which may be employed in the filters of the present invention may be any suitable material according to conventional practices in this art. It suffices to say that more common filter media are composed of a rectangular batt of polyester fibers, cotton fibers, or other similar materials. As mentioned above, it is a requirement in this art that the filter media per se be totally flame retardant and to this end such media can be rendered flame retardant by employing suitable flame retardant agents, again according to conventional practice in this art. The particular type of construction of the air filter media per se may likewise vary according to conventional techniques, it being understood that it is most desirable that the air pressure drop of the filter media be maintained at a minimum, preferably no more than about 0.20 pound per square inch when measured at a flow of 500 cfm per square foot of media area.

Such other factors as are common with conventional practices in the construction and fabrication of the air filter media per se — e.g. the dimensions of the filter media, may all be employed in accordance with this invention. Typically the dimensions range from one-half to 2 inches in thickness, a width of from 30 inches or smaller to 60 inches or more depending on the type of filter, and lengths again varying on the type of filter and ranging from 12 inches to between 45 to 90 feet for roll or cartridge type filter media.

The denier of the fibers employed in the more common filter constructions normally are about 6, and use 2 inch fiber lengths. Generally speaking, the fibers are laid in a random pattern by various conventional methods of media production to form a resilient batt, with the weight of the batts conventionally being about 2,200 grains per square yard plus or minus 10 percent — although this may vary according to the different requirements for different filter media.

If desired, the scrim may be secured or held in juxtaposition with the air filter media by suitable means. Such means include flame retardant adhesives, clips or staples, etc. In the latter type of case, where a scrim is placed in juxtaposition with an air filter medium and employed as, e.g. a domestic filter for furnaces, the scrim and filter medium may be maintained in juxtaposition with a frame of metal or other suitable material, in which case an adhesive is not required because of the overall small area. In the cartridge or roll type of filter, it is most desirable to ensure that the scrim is held in juxtaposition with the filter media by use of suitable bonding techniques, e.g. spray bonding employing non-flammable adhesives. Bonding may be on an intermittent, random or uniform pattern, generally not by employing a complete adhesive coating as this has a tendency to cut down on the air volume and velocity through the filter. Any one of a number of suitable well known non-flammable adhesives may be employed, again according to conventional practices and techniques.

In some cases, it may be desirable to provide a scrim on both major surfaces or faces of a rectangular air filter medium; however, conventional practices normally only include one layer of scrim in juxtaposition with one major face. Still further, if desired, the air filter medium can be completely enveloped with a scrim whereby the air filter medium is packaged within the open-network scrim.

Having thus generally described the invention, reference will now be made to the following Examples illustrating preferred embodiments only.

EXAMPLE I

The product marketed under the name "PETROFIN", a polybutene composition, was treated with up to 80 percent by weight of a conventional flame retardant for hydrocarbons, to produce a mixture of the polybutene and the flame retardant additive. This mixture was subsequently employed as a tackifier composition in the following Example.

EXAMPLE II

An air filter media was produced consisting of polyester fibers (6 denier 2 inch staple fiber) having a weight of approximately 2,200 grains per square yard, which was treated with a fire retardant additive in the amount of about 1,100 grains per square yard of filter media.

A conventional vinyl coated glass fiber scrim sheet was then adhesively bonded to the media using a flame retardant adhesive. The resulting structure was thereafter coated with the tackifier mixture of Example I in an amount of approximately 1,600 grains of the polybutene fire retardant composition per square yard. The resulting structure was permitted to dry.

An open flame was then introduced into proximity with the polybutene treated filter media and the polybutene composition immediately caught fire throughout the whole filter, notwithstanding the 80 percent by weight of flame retardant agent incorporated into the tackifier composition.

In the above Example and following Examples, flame retardancy of the filter was determined by ASTM test number 696, generally used for this purpose.

EXAMPLE III

Additional filter media were then constructed similar to those described in Example II, but in these cases, open-network structure polypropylene was employed as the scrim material. In the following Table, structure A employed a scrim having a regular uniform weave of 4-by-4 strands per inch (forming rectangularly shaped apertures), weighing about 3 pounds per thousand square feet; structure B scrim had a regular uniform weave of about 4-by-6 strands per inch (forming rectangularly shaped apertures) and weighed about 7 pounds per thousand square feet; and structure C employed a regular uniform weave of 2-by-2 strands per inch (forming rectangularly shaped apertures) and had a weight of about 9 pounds per thousand square feet.

Again, with each of these open-network polypropylene scrims, the filter media was bonded to the scrim by use of a suitable flame retardant adhesive in a non-continuous manner.

Then, polybutene tackifier, without any flame retardant additive, was padded onto the filter structure in an amount of about 1,600 grains per square yard so as to coat and leave on the scrim material a residue.

Proceeding according to ASTM test 696, the results are as shown below.

TABLE I

| Filter Structure with Scrim | Flame Retardancy |
|---|---|
| A | Good |
| B | Good |
| C | Good |

In all cases, the scrim structure of the present invention provided flame retardancy characteristics for the total filter, and in no case did the flame become self-propagating, contrary to what would normally be expected in view of the readily combustible tackifier that had been used. Moreover, the pressure drop characteristic of the scrim for the filters employing such material was approximately 0.02 inch when measured at an air flow of 500 cfm per square foot of medium area. Also, when exposed to naked flame, the areas of the scrim in contact with or immediately surrounding the open flame, merely melted, or caught fire and dropped away from the adjacent scrim areas, thus preventing flame propagation.

The embodiments of the invention in which an exclusive property or privilege is claimed are defined as follows:

1. A filter, comprising, a web of at least flame retardant material having at least one major filtering face, and a scrim layer, in juxtaposition with said major face said scrim layer comprising a self-extinguishing non-flame propagating polyolefin material having an open-network structure with an air pressure drop characteristic not exceeding 0.10 inch/water when measured at an air flow of 500 cfm per square foot of medium area, said polyolefin material having a weight of between about 3 to 9 pounds per 1,000 square feet, said filter having been treated with a normally combustible hydrocarbon tackifier and said polyolefin material having a melting point lower than the temperature at which said combustible hydrocarbon burns.

2. The product of claim 1, wherein said scrim comprises an open-network polypropylene structure.

3. The product of claim 1 wherein said normally combustible hydrocarbon tackifier is a polybutene tackifier.

4. The product of claim 1, wherein said filter medium comprises a batt of polyester fibers.

5. The product of claim 1, wherein said scrim is a flexible scrim, said scrim having a tensile strength of 5 to 13 pounds per inch.

* * * * *